United States Patent [19]

Lennartz

[11] Patent Number: 4,804,481
[45] Date of Patent: Feb. 14, 1989

[54] HELICAL SPRING APPARATUS AND PROCESS FOR DETACHING FILTER CAKE

[75] Inventor: Rüdiger Lennartz, Pulheim, Fed. Rep. of Germany

[73] Assignee: Boll & Kirch Filterbau GmbH, Kerpen, Fed. Rep. of Germany

[21] Appl. No.: 93,977

[22] Filed: Sep. 8, 1987

[30] Foreign Application Priority Data

Sep. 16, 1986 [DE] Fed. Rep. of Germany ....... 3631399

[51] Int. Cl.$^4$ ............................................. B01D 29/38
[52] U.S. Cl. .................................... 210/791; 210/350; 210/357; 210/384; 210/388; 210/497.1; 55/293; 55/304
[58] Field of Search ............... 210/748, 791, 350, 357, 210/384, 388, 497.01, 497.1; 55/529, 292, 293, 304

[56] References Cited

U.S. PATENT DOCUMENTS

| | | | |
|---|---|---|---|
| 2,642,186 | 6/1953 | Garland et al. | 210/357 |
| 3,487,931 | 1/1970 | Paulson | 210/497.1 |
| 3,870,640 | 3/1975 | Reece | 210/497.1 |
| 3,937,281 | 2/1976 | Harnsberger | 210/350 |
| 4,199,454 | 4/1980 | Sarture | 210/497.1 |
| 4,237,978 | 12/1980 | Calderon | 210/497.1 |

FOREIGN PATENT DOCUMENTS 8135058 4/1982 Fed. Rep. of Germany .
2828976 6/1983 Fed. Rep. of Germany .

Primary Examiner—Richard V. Fisher
Assistant Examiner—Wanda L. Millard
Attorney, Agent, or Firm—Body, Vickers & Daniels

[57] ABSTRACT

In the filter according to the invention (precoated filter), gap-type filter elements (11) designed in the manner of filter cartridges and consisting of a profile wire wound into a helical spring are used. In order to detach the adhering filter cake, the gap-type filter element (11) is stretched in its axial direction, with the filter gaps being opened at the same time, this appropriately being carried out be means of a stretching drive which at the same time can be designed as a vibratory drive. The gap-type filter elements are at the same time made to vibrate, and this can be obtained by means of periodic stretching and shortening or by making the stretched gap-type filter elements vibrate. The vibratory movement is appropriately executed at a frequency matching the natural frequency of the gap-type filter elements.

32 Claims, 4 Drawing Sheets

FIG.7
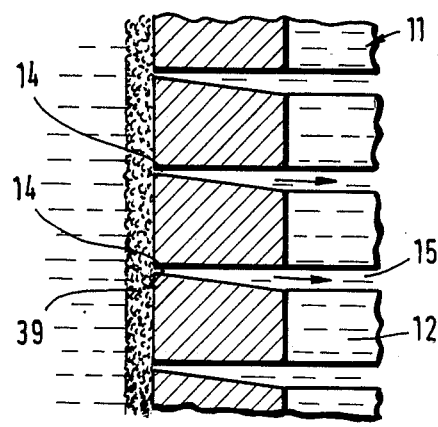
FIG.10
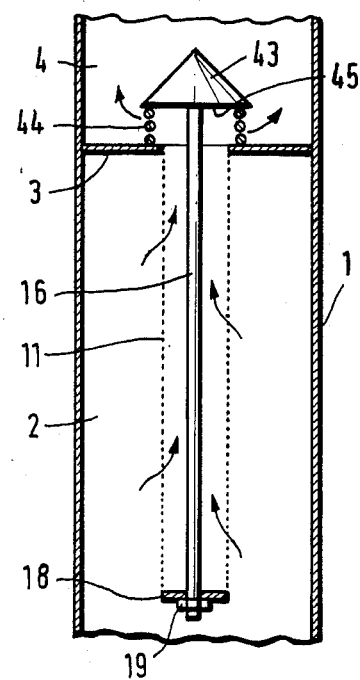
FIG.8
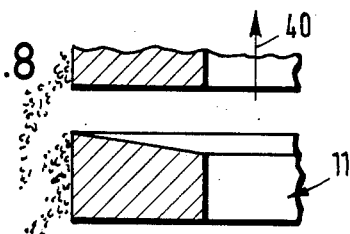
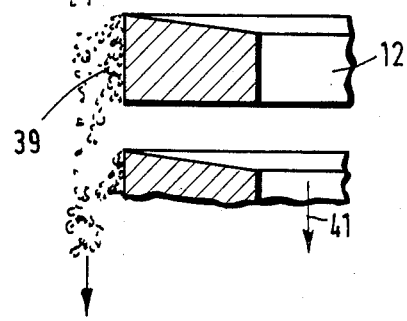
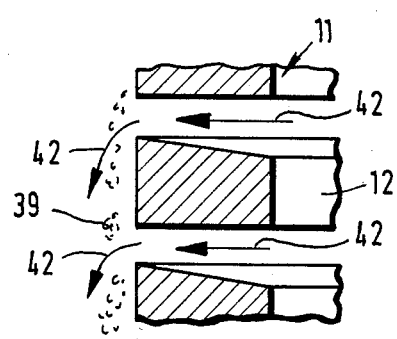
FIG.9
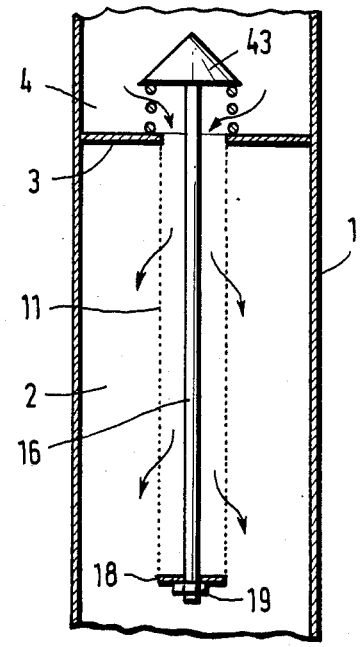
FIG.11

HELICAL SPRING APPARATUS AND PROCESS FOR DETACHING FILTER CAKE

The invention relates to a filter, especially a precoated filter (also called alluvial or matting filter), with at least one gap-type filter element arranged in the filter housing and consisting of a profile wire which is wound into a helical spring and the screw turns of which are supported on one another by means of stud-like or rib-like elevations or the like, defining the filter gaps.

Filters with filter elements designed in the manner of filter cartridges are known in many designs, for example as precoated or matting filters or as flush-back filters. In there are used, among other things, filter cartridges which carry a tubular filter cloth drawn onto a cylindrical supporting body. The supporting body can consist, for example, of a helically wound wire element stiffened by means of axial bars, to which the screw turns of the wire element are connected, for example by welding.

It is also known, in precoated filters with a dry discharge, to use gap-type filter elements which are designed in a manner of filter cartridges and which consist of a helically wound profile wire, the screw turns being supported on a supporting structure (German Patent Specification No. 2,828,976). In a known gap-type filter element with an inner supporting body, small stud-like or rib-like projections, by means of which the screw turns are supported on one another and which at the same time define the filter gaps, are formed on the screw turns (German Utility Model No. 81,35,058).

On precoated or matting filters with a dry discharge of the filter cake, at which the invention is aimed for preference, the filter cake consisting of the filter aid and the filtered-out dirt is dried on the filter cartridges or on the gap-type filter elements by introducing compressed air so as to force out the liquid contained in the filter chamber, the compressed air at the same time drying the filter cake adhering to the filter elements. In order to detach the dried filter cake subsequently, the entire filter insert is made to vibrate by means of a knocking, vibrating or jolting device. It has been shown, in practice, that, above all on precoated filters of high capacities which have a plurality of filter elements inside them, to release the filter cake it is necessary to exert very high impact forces which lead to serious noise nuisance and to considerable vibrations and shock stresses in the system. To prevent the shocks from being transmitted to the parts of the installation and to the building, large-size filter apparatus has to be placed on shock-absorbers.

Where the known precoated filters are concerned, even under sharp jolting knocks it is often possible to release the dried filter cake only if the filter cake on the filter elements has a relatively large thickness. This makes it necessary to arrange the filter elements suspended in the filter housing at a correspondingly long distance from one another. Accordingly, at the high throughput capacities required, the filter apparatuses have to have large dimensions.

The object of the invention is, primarily, to design filter units of the known type, but especially precoated or matting filters with cake drying as a result of the introduction of gas or air, with the abovementioned gap-type filter elements being used, in such a way that the filter cake can be detached reliably even without relatively high impact energy and even when relatively firmly adhering filter cakes of smaller thicknesses are removed from the gap-type filter elements.

According to the invention, this object is achieved because, in order to detach the filter cake, there is a stretching device which stretches the gap-type filter element axially, at the same time opening the filter gaps. Preferably, the stretching device has a stretching drive coupled to the axially movable end of the gap-type filter element.

According to a further essential feature of the invention, the stretching of the gap-type filter element designed as a helical spring takes place at the same time as an axial jolting or vibrating movement of the latter. The stretching drive can, at the same time, be the vibratory drive, by means of which the gap-type filter element is periodically stretched elastically. On the other hand, however, the arrangement can also be such that, in addition to the stretching device or the stretching drive, there is a vibration generator or the like which subjects the stretched gap-type filter element to axial vibrations. The abovementioned vibratory drive or the vibration generator is appropriately designed so that it operates at a vibration frequency corresponding at least approximately to the natural frequency of the gap-type filter element.

Because the filter is designed according to the invention, it is possible to detach even relatively firmly adhering filter cakes from the gap-type filter element designed in the manner of a helical spring, since, during the stretching or elongation of the gap-type filter element, the filter cake is broken open virtually on all the screw turns, that is to say at a multiplicity of locations, and thereby has its composite structure loosened and is destroyed. If the filter element is also subjected to a periodic axial bumping movement, that is to say an axial vibration in its longitudinal direction, the release of the filter cake is additionally assisted thereby, as a result of which the filter cake is removed from the gap-type filter elements quickly and completely. The axial vibration of the gap-type filter element requires only a comparatively low vibration or impact energy, especially since the helical spring forming the gap-type filter element constitutes, in the stretched state, a relatively soft spring which can be made to vibrate sharply by means of only slight energy. Because the operation can only by carried out with a considerably reduced impact energy or vibration energy, there is also no appreciable noise nuisance. Moreover, no harmful vibrations and shocks are transmitted to the installation and to the building by means of the machinery located here. It has been shown that, with the filter according to the invention, even relatively thin filter cakes can be released reliably. This also affords the advantage that the gap-type filter elements designed in the manner of filter cartridges can be arranged in the filter housing at a relatively short distance from one another, so that the filter as a whole can be made considerably smaller. In precoated filters, the consumption of filter aid is reduced substantially because of the smaller filter-cake thickness. The helically wound gap-type filter elements do not require an inner supporting body or the like which supports the individual screw turns on the inside. The gap-type filter elements can be designed in a manner of cylindrical filter cartridges. However, they can also be made slightly conical, as is likewise known. Especially low impact energies are obtained if the vibratory drive or the vibration generator operates at a vibration frequency which corresponds at least roughly approximately to the natural frequency of the gap-type filter element. Spring vibrations in the resonant range of the gap-type filter element arise thereby.

In a preferred embodiment of the invention, the abovementioned stretching device has a lifting rod which passes through the gap-type filter element at a radial distance from the screw turns and which, at one end, is connected to the axially movable end of the helical gap-type filter element and, at its other end, reaches out of the end of the gap-type filter element fixed in the filter housing and here is coupled to the stretching drive or the vibratory drive or the like. The lifting rod at the same time appropriately consists of a tube which, over its length region located in the gap-type filter element, has at least one tube orifice making a connection with the interior of the gap-type filter element and, at its outer end, has a tube orifice making a connection with the filtrate space of the filter. The first-mentioned tube orifice is appropriately located near the tube end connected to the axially movable end of the gap-type filter element. The tubular lifting rod thus serves for conveying the filtrate to the filtrate space of the filter.

It is generally recommended to mount the gap-type filter element in the filter housing in a vertical arrangement. Thus, the gap-type filter element is appropriately suspended at its top end on a partition wall separating the upper filtrate space from the lower sludge space of the filter housing, as is known. In the bottom of the sludge space there can be a dirt discharge orifice closable by means of a closing member, for example a bottom flap or the like. In this preferred embodiment of the filter according to the invention, the axially movable end of the gap-type filter element is the lower end of the latter which is at a distance above the dirt discharge orifice which is greater than the stretching travel of the gap-type filter element. The lifting rod appropriately has a rod extension which projects upwards out of the filtrate space and which is coupled, above the filtrate space, to the stretching or vibratory drive.

In general, a relatively large number of identical gap-type filter elements are arranged parallel to one another in the filter housing. In this case, the arrangement is appropriately such that the lifting rods projecting from the fixed end of the gap-type filter elements are connected to a common connecting member, to which is assigned a stretching drive common to the connected gap-type filter elements, preferably in the form of a vibratory drive, or in combination with a vibration generator.

A small compressed-air cylinder with an axially movable piston can be used for the abovementioned stretching drive or the combined stretching and vibratory drive. The vibration generator is a linear vibration motor, for example an electromagnetic vibration generator.

On a precoated filter with a dry discharge of the filter cake, as is known per se the arrangement is appropriately such that the filter housing contains an upper filtrate space with a filter outlet and a sludge space which is separated from the filtrate space by means of a partition wall and which is equipped with a sludge inlet, an upper compressed-gas feedline and a closable discharge orifice arranged at the bottom and intended for the discharge of the filter cake, and arranged in the gap-type filter elements suspended on the partition wall are the tubular lifting rods for conveying the filtrate, which make a connection with the filter space and are connected to the lower ends of the gap-type filter elements and here have tube orifices making the connection with the interior of the gap-type filter elements.

If appropriate, the filter according to the invention can also be used without a filter aid. Even in this case, it is possible for the filter cake adhering to the gap-type filter elements to be dried as a result of the introduction of compressed air or another compressed gas. On the other hand, however, the filter according to the invention can also be operated as a reversible-flow filter, in which case the reverse-flow process is assisted and accelerated as a result of the measures provided according to the invention.

Good results in releasing the filter cake can be achieved if the gap-type filter element is periodically stretched axially and shortened again in rapid sequence. A frequency of at most approximately 20 Hz, preferably 2–10 Hz, is appropriately used for this. The amount of periodic stretching of the gap-type filter element can be 20 to 120 mm, generally 40–80 mm, for a length of the latter of approximately 1,000 mm.

If the gap-type filter element is first stretched, to open its filter gaps, and only then is subjected to axial vibration in the stretched state, the amplitude of the vibratory movement can be considerably less than the stretching travel. As mentioned, the operation is advantageously carried out with a vibration in the region of the natural frequency (resonant frequency) of the gap-type filter element.

Further advantageous embodiments of the invention are given in the claims.

The invention is explained in detail below with reference to exemplary embodiments illustrated in the drawing. In the drawing:

FIGS. 7 to 9 show part sections through the gap-type filter element according to FIGS. 3 to 6 in the unstretched state (FIG. 7) and stretched state (FIG. 8) and when used on a reversible-flow filter (FIG. 9);

FIGS. 10 and 11 show a reversible-flow filter according to the invention in a highly diagrammatic simplified representation, during filter operation (FIG. 10) and during reverse-flow operation (FIG. 11).

Figure 1:
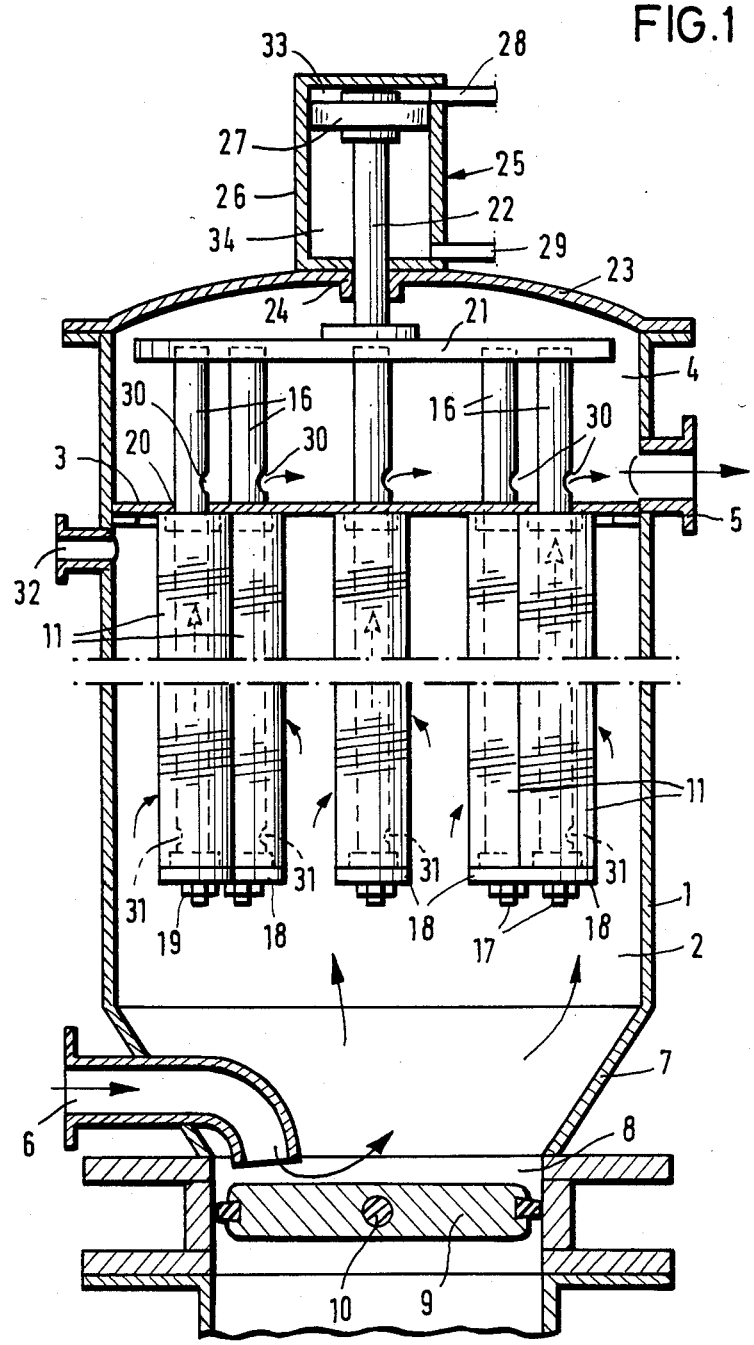
FIG. 1 shows a vertical section through a filter according to the invention during the filter process.
Figure 2:
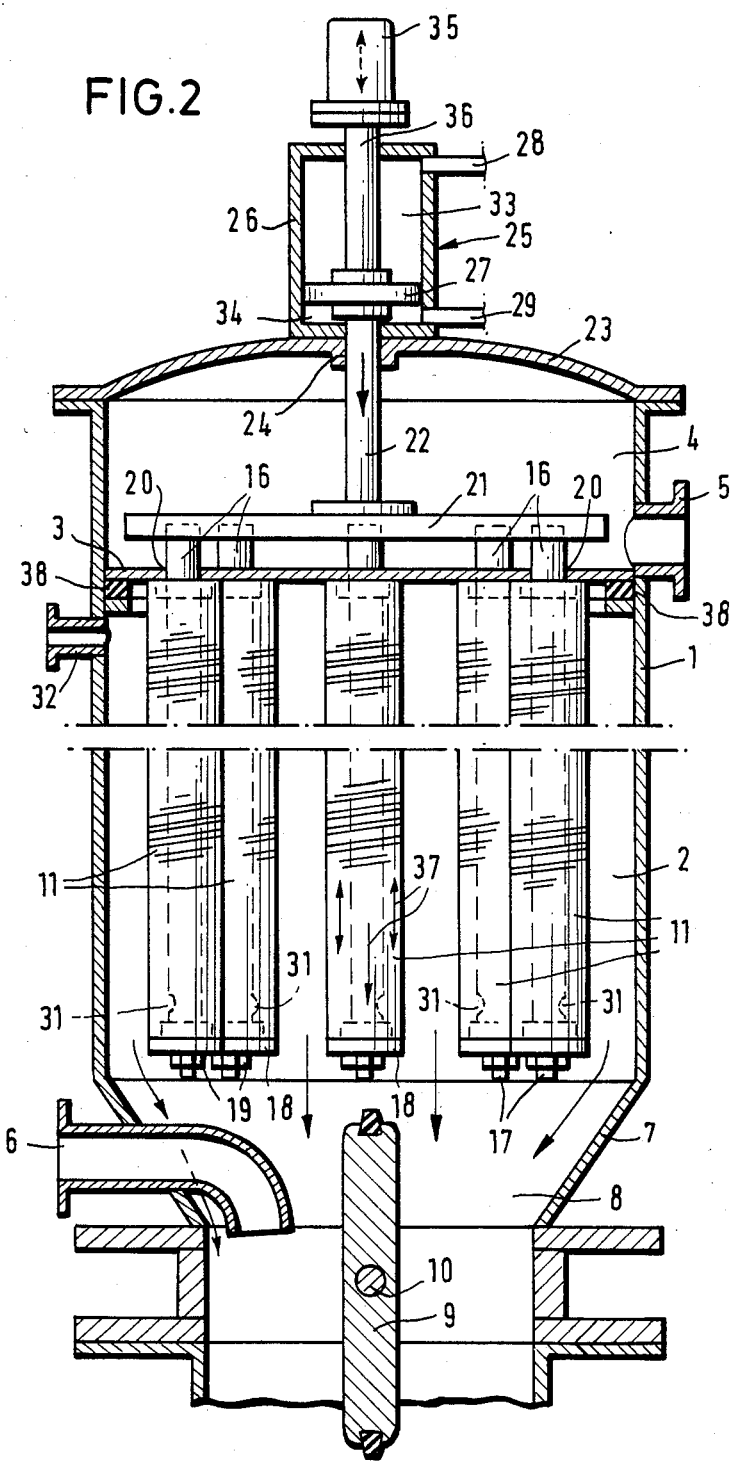
FIG. 2 shows a vertical section through the filter according to FIG. 1 during the release and discharge of the filter cake, a stretching and vibratory drive changed in comparison with that of FIG. 1 being provided.
Figure 3:
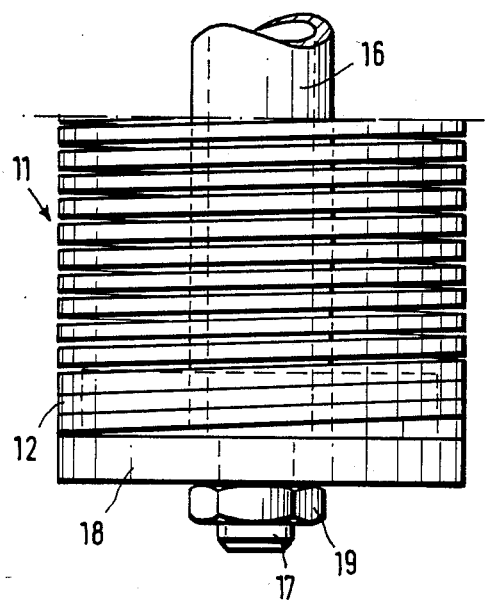
FIGS. 3 to 6 show part views and part sections of a gap-type filter element provided in the filter according to the invention, FIG. 6 showing a view in the direction of the arrow VI of FIG. 5.

The filter illustrated in FIGS. 1 and 2 has a cylindrical filter housing 1 with a lower sludge space 2 and with an upper filtrate space 4 which is separated from the latter by means of a partition wall 3 and which is equipped with a filter outlet 5. The filter inlet 6 is located in the lower region of the sludge space 2. The latter has, in its external-shaped bottom region 7, a discharge orifice 8 which is intended for the dirt discharge or the filter-cake discharge and which can be closed by means of a closing member 9. The latter consists of a flap 9 which is pivotable about a pivot pin 10.

The sludge space 2 accomodates a greater or lesser number of identical gap-type filter elements 11 in a parallel arrangement relative to one another. The gap-type filter elements 11 are arranged suspended on the partition wall 3. They are each connected firmly at their top end to the partition wall 3, being sealed off at the same time.

Figure 4:
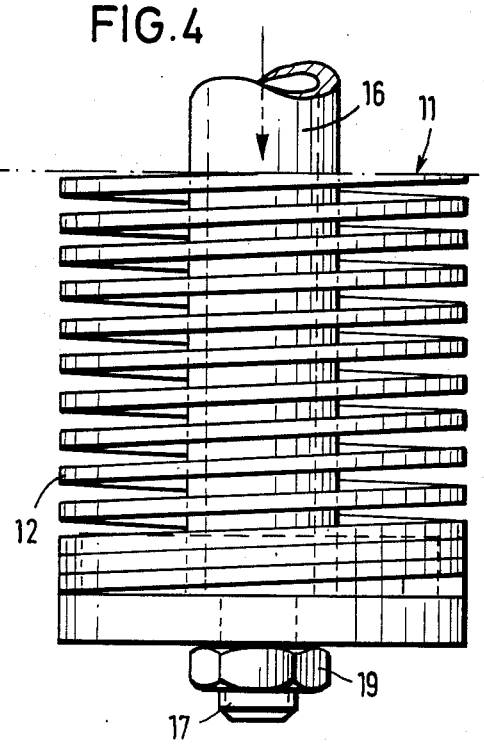
Figure 5:
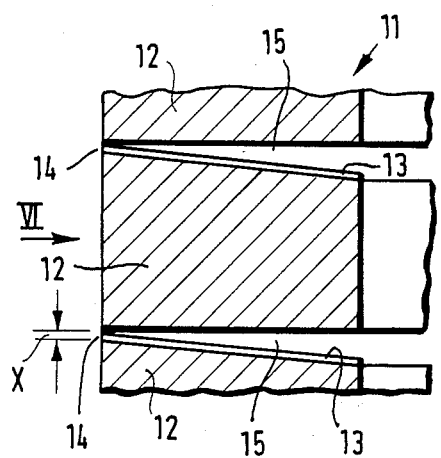
Figure 6:
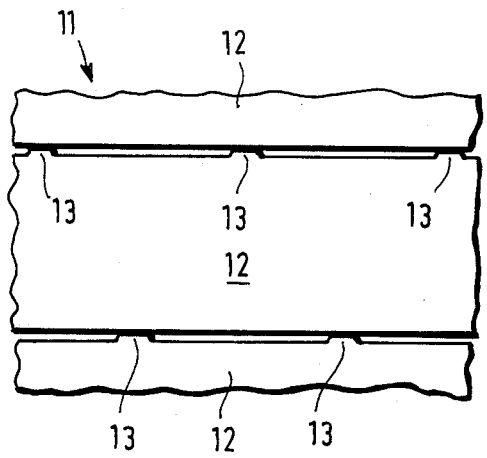

As shown especially in FIGS. 3 to 6, the gap-type filter elements 11 consist of a profile wire 12 wound into a helical spring and having an approximately trapezoidal cross-section. At the same time, there are formed on the upper surfaces of the individual screw turns small studs or ribs 13 which are arranged distributed over the periphery of the screw turns and which can extend over the entire radial width of the profile wire (FIG. 5). The screw turns 12 are thus supported on one another via the studs or ribs 13, and the studs or ribs 13 define the filter gaps 14 of the desired gap width X.

Gap-type filter elements of the abovementioned type are known per se. They consist either of a cylindrical helical spring or of a slightly conical helical spring tapering conically towards its lower end. The approximately radial throughflow channels 15 widen from the outer filter gaps 14 towards the interior of the helical spring, as shown in FIG. 5. Furthermore, the arrangement is such that the helical spring, in the unloaded state, contracts elastically (FIG. 3), and in this state the individual screw turns are supported relative to one another on the stud-like or rib-like elevations 13.

The gap-type filter elements 11 do not have an inner supporting body which supports the individual screw turns from the inside. The helical spring forming the gap-type filter element 11 can be stretched elastically, with the filter gaps 14 thereby being opened, as shown in FIG. 4. This stretching is carried by means of a stretching device with an associated stretching drive. The stretching device has a tubular lifting rod 16 which passes axially through the associated helical spring over its entire length at a radical distance from the screw turns and which at its lower end is connected, by means of a threaded bolt 17 and a retaining disc 18, to the axially movable end of the helical spring. The latter is connected at its end to the retaining disc 18, at the same time being sealed off. The connection is secured by means of a nut 19 screwed onto the thread of the bolt.

The tubular lifting rod 16 of the gap-type filter elements 11 each pass through an orifice 20 in the partition wall 3 and on the inside of the filtrate space 4 are connected to a common connecting member 21 consisting of a top plate or the like. The latter possesses centrally a vertical rod extension 22 which leads out of the filtrate space 4 at the top and which is guided in an orifice 23 in the housing cover 24, at the same time being sealed off.

Placed on the cover 23 is a stretching drive 25 which, in the exemplary embodiment according to FIG. 1, at the same time forms the vibratory drive. The stretching drive 25 consists of a compressed-air cylinder with a piston 27 which is guided vertically in the cylinder 26 and to which the rod extension 22 is connected as a piston rod. The inflow and flow-off lines for the compressed air on both sides of the piston 27 are designated by 28 and 29. In the upper piston position shown in FIG. 1, all the lifting rods 16 are raised and the helical springs of the gap-type filter elements 11 are accordingly pushed tightly together, so that their screw turns are supported relative to one another via the stud-like or rib-like elevations 13. This represents the filter position during the filter process. In this lifting position, orifices 30 in the casing of the tubular connecting rods 16 are located inside the filtrate space 4. The lifting rods 16 each have, near their lower ends, that it to say near their points of connection to the lower axially movable ends of the gap-type filter elements 11, at least one tube orifice 31 which makes a liquid connection between the interior of the gap-type filter elements 11 and the lifting rod and consequently also with the upper filtrate space 4. Since the helical springs of the gap-type filter elements 11 are designed so that they contract elastically, when the stretching drive 25 is in the pressureless state they assume the position shown in FIG. 1, in which the lifting rods 16 are held in their upper lifting position as a result of the spring force. A further helical spring which keeps the gap-type filter elements 11 pushed together during the filter operation can be arranged underneath the piston 27 in the cylinder 26 of the stretching drive 25.

The filter illustrated in FIGS. 1 and 2 is preferably designed as a precoated or matting filter. In the upper region of its sludge space 2, it has a connection 32 for introducing a compressed gas, usually compressed air. The compressed gas feedline can be shut off by means of a valve (not shown).

Before actual fine filtration begins, a suitable precoating medium (filter aid), for example diatomite, is first deposited onto the gap-type filter elements 11. A suspension of liquid and filter aid prepared in a precoating vessel is, in this case, passed through the filter unit. After the precoating mixture has been pumped round several times, the filter aid is deposited on the gap-type filter elements 11; the desired filter aid layer of a predetermined thickness thus forms on the outer faces of the gap-type filter elements 11. After the precoating of the filter aid has ended, the change-over to filter circulation is made by means of valves. During this time, the dirty liquid to be filtered is conveyed into the sludge space 2 via the filter inlet 6 by means of a pump. The dirty liquid flows through the filter aid layer lying on the gap-type filter elements 11 and, with dirt being precipitated in the filter aid layer, passes as a filtrate via the filter gaps 14 into the gap-type filter elements 11, where it flows via the tube orifices 31 and the axial channels of the tubular lifting rods 16 upwards through the tube orifice 30 into the filtrate space 4. The filtrate leaves the filtrate space 4 via the filter outlet 5.

During filter operation, as soon as a predetermined differential pressure is reached between the filter inlet and the filter outlet or the charging volume of the gap-type filter elements 11 is reached, the filter unit is changed over to regeneration. During this, as is known, compressed air or another compressed gas is introduced from above into the sludge space 2 via the feed line 32. The inflowing compressed air or the like forces the sludge located in the sludge space 2 out of the sludge chamber through the lower filter inlet 6; at the same time, it forces the filtrate still contained in the interior of the gap-type filter elements 11 and their lifting rods 16 into the filtrate space 4 via the tubular lifting rods 16. During this process, the filter cake adhering to the filter elements 11 is at the same time dried to the desired moisture content by the air flowing through, so that the filtered-out dirt, together with the filter aid, can subsequently be discharged with a relatively low residual moisture. For this purpose, the compressed-air feedline is shut off and the dirt discharge orifice 8 is opened as a result of the pivoting of the flap 9, as shown in FIG. 2. As a result of pressure exerted on the upper cylinder space 33 of the stretching drive 25, the piston 27 together with the lifting rods 16 is moved downwards, as a result of which the gap-type filter elements 11 consisting of the helical springs are stretched in their longitudinal direction, as shown in FIG. 2. During this stretching, the filter gaps 14 between the individual screw turns of the gap-type filter elements 11 open, as shown in FIG. 4. The filter cake adhering to the individual screw turns is thereby broken open and its composite structure largely destroyed.

The stretching drive 25 is appropriately at the same time used as a vibratory drive which is designed so that, when the cylinder spaces 33 and 34 are subjected alternately to compressed air and the compressed-air inflow and flow-off lines 28, 29 are controlled correspondingly, the piston 27 consequently executes a periodic lifting movement in the downward and upward directions, with the result that the gap-type filter elements 11 are periodically stretched and shortened again correspondingly. This periodic vibratory movement of the gap-type filter elements 11 ensures that the filter cake is quickly released and falls off, even when it adheres firmly. The falling-off filter cake is discharged from the filter housing 1 via the bottom orifice 8.

In the modified embodiment according to FIG. 2, the stretching drive 25 has assigned to it a separate vibration generator 35 which is attached to the piston rod 36 guided out of the cylinder 26 at the top. Here, the arrangement is such that, as a result of the downward movement of the piston 27, the gap-type filter elements 11 are first stretched, with their filter gaps 14 being opened, whereupon the stretched helical springs of the gap-type filter elements 11 are made to vibrate axially by means of the vibration generator 35, as indicated by arrows 37 in FIG. 2. During the vibration, the gap-type filter elements consequently remain stretched.

The stretching stroke of the gap-type filter element 11 is appropriately calculated so that all the gaps 14 between the screw turns open at least approximately during stretching. The amount of periodic stretching is between 20 and 120 mm, preferably around 40 to 80 mm, for a maximum length of the gap-type filter elements of approximately 1,000 mm. With such an amplitude of the vibratory movement, the stretching drive 25 according to FIG. 1, serving at the same time as a vibratory drive, can operate at a frequency of at most 20 Hz, generally approximately 2 to 10 Hz, in order to make it possible to detach the filter cake quickly.

In contrast, in the embodiment according to FIG. 2, the vibration generator 35 can operate with a vibration amplitude which is clearly less than the stretching travel of the gap-type filter elements by means of the stretching drive 25. Moreover, the system is appropriately adjusted so that a vibration frequency corresponding at least roughly approximately to the natural frequency of the gap-type filter elements is used, so that superposed resonant vibrations are established in the helical springs of the gap-type filter elements.

The above-described exemplary embodiments can be changed in various respects, the filter according to FIGS. 1 and 2 can also be used when the filter is operated without a filter aid. Other drive devices, for example electromagnetic drives, which can also at the same time form the vibratory drive can be used as the stretching drive 25. For the separate vibration generator 35, a small eccentric drive or a linear vibration motor, for example an electromagnetic vibration generator, can be used. There can be a different number of gap-type filter elements 11 arranged in the filter housing. If appropriate, there can also be only a single gap-type filter element of the type described in the filter housing, in which case it can have a larger diameter. Also, the filter can be used as a reversible-flow filter, in which a reverse flow of the gap-type filter element or gap-type filter elements 11 is brought about in the stretched state and appropriately also in the vibration state by means of the intrinsic medium (filtrate). The partition wall 3 of the filter housing, on which the gap-type filter elements 11 are suspended, can be arranged rigidly and fixedly in the filter housing. It is also possible to mount the partition wall 3 elastically, as indicated at 38 in FIG. 2. Where precoated filters are concerned, when the compressed air or the like is introduced the sludge is appropriately forced out through the filter inlet 6. Instead of this, however, an additional outlet can also be provided in the lower region of the filter housing.

The operation of detaching the filter cake 39 from the stretched gap-type filter element 11 vibrating in its longitudinal direction according to the arrows 40 and 41 is indicated in FIG. 8. It can be seen that the filter cake 39 first adhering firmly and then breaking open by means of the spring stretch is loosened substantially as a result of the stretching of the gap-type filter element 11, so that, overcoming the force of adhesion on the screw turns, it falls down. FIG. 9 illustrates highly diagrammatically the additional reverse flow through the gap-type filter elements 11 by the reverse-flow stream flowing in the direction of the arrow 42. The reverse-flow stream flows through the gaps between the screw turns, these gaps being of enlarged cross-section as a result of the stretching of the gap-type filter element, thus ensuring a thorough cleaning of the screw turns of the gap-type filter elements.

The filter according to the invention can advantageously also be designed so that the stretchable gap-type filter element or elements form, together with a spring device exerting a prestress in the direction of the gap-type filter element or elements, an elastic axial vibration system which can be made to vibrate axially by means of only slight vibration energy. This vibration energy can be exerted by a vibration generator of the type mentioned. In a reversible-flow filter, however, the vibration energy for the axial vibration of the system can also be exerted by the flow medium or reverse-flow medium. At the same time, the spring force of the spring device prestressing the gap-type filter element or elements in filter operation is appropriately adjusted so that, under the differential-pressure effect or the flow conditions in reverse-flow operation, it performs a function of a vibrating spring for the axial vibration of the gap-type filter element or elements. In this case, there is therefore no need for either an addinal vibration generator or an actively working stretching drive.

FIGS. 10 and 11 show, in a highly simplified diagrammatic representation, a reversible-flow or flush-back filter based on the abovementioned principle. The gap-type filter element 11 formed by the helical spring has, on the inside, the lifting rod 16 which here has no axial passage channel for conveying the filtrate. The lifting rod 16 is connected in the way described to the lower axially movable end of the gap-type filter element 11 and the top projects into the filtrate space 4 from the end of the gap-type filter element 11 fixed in the partition wall 3. At this end, the lifting rod 16 carries a rod attachment 43 which covers the filtrate outlet orifice at a distance at the top end of the gap-type filter element 11 and which performs the function of a spring plate for a spring device 44 designed, here, as a helical spring and supported against the partition wall 3. The spring device 44 acting against the rod attachment 43 from the underside keeps the helical spring of the gap-type filter element 11 under a predetermined prestress, in which its screw turns are supported on one another at the stud-like or rib-like elevations or the like during filter operation. Accordingly, the gap-type filter element 11 is mounted elastically in the axial direction by means of the spring device 44; it forms, together with a spring device 44, an axial vibration system.

The rod attachment 43 is designed as an approximately conical flow body, the underside 45 of which can form a dynamic-pressure surface. During filter operation (FIG. 10) the medium to be filtered flows through the gap-type filter element 11 from the outside inwards and as a filtrate upwards in the gap-type filter element, and at the outflow from the gap-type filter element it strikes the dynamic-pressure surface 45 and is deflected here in the direction of the arrow at the flow body. The vibration system is stable during filter operation, that is to say the gap-type filter element 11 is kept prestressed under the forces exerted on it.

In reverse-flow or flushing-back operation (FIG. 11), the reverse-flow medium flows through the gap-type filter element 11 from the inside outwards, and within the filtrate chamber 4 it flows in the direction of the arrow round the rod attachment designed as a flow body. During the reverse-flow operation, the flow conditions, that is to say the forces exerted on the gap-type filter element 11 in the axial direction, are coordinated in this operating state in such a way that the gap-type filter element 11 is made to vibrate axially, the spring device 44 forming a vibration spring. It goes without saying that the spring device 44 can be adjusted so that, in reverse-flow operation, it allows the axial vibration of the gap-type filter element 11 with a greater or lesser vibration amplitude under the operating conditions prevailing here, that is to say as a result of the reverse-flow stream. Here too, the axial vibration generated by means of the reverse-flow stream assists the release of the filter cake.

It goes without saying that the above-described system of a reverse-flow filter can also be used when the filter has more than only one gap-type filter element 11. In this case, the individual gap-type filter elements 11 appropriately form a common vibration system with a common prestressing and vibrating spring 44, although it is also possible for each gap-type filter element 11 to have its own spring device 44 assigned to it.

I claim:

1. A process for detaching the filter cake from a filter element designed in the manner of a helical spring, between the screw turns of which the filter gaps are located, including the steps of periodically stretching and shortening said filter element in the axial direction in rapid sequence, at a frequency of 2-20 Hz.

2. The process of claim 1, wherein the amount of periodic stretching is within the range of approximately 20 to approximately 120 mm.

3. The process of claim 1 further including the step of subjecting said filter element to a vibration in the resonant frequency range.

4. A process for detaching the filter cake from a filter element designed in the manner of a helical spring, between the screw turns of which the filter gaps are located, including the steps of stretching the filter element with its filter gaps thereby being opened, and then subjecting the stretched filter element to an axial vibration of an amplitude which is less than the stretching travel.

5. The process of claim 4 wherein said vibration is in the resonant frequency range.

6. A gap type filter element for use in a housing of a liquid filter, said filter element comprising a profile wire wound into a coil spring having an axis and spaced apart projections extending axially from the coils of said spring, said spring having an axially compact filtering position with said projections extending between adjacent coils and defining filter gaps therebetween; and, means for extending said spring out of said compact position to move adjacent ones of said coils apart in the direction of said axis.

7. The improvement of claim 6 wherein said spring has a fixed end and an axially movable end, and said extending means is connected to said movable end.

8. The improvement of claim 7 wherein said extending means comprises a drive means and a driven member, said driven member connecting said drive means to said movable end of said spring.

9. The improvement of claim 8 wherein said driven member comprises a shaft extending through the interior of said spring.

10. The improvement of claim 9 wherein said housing includes a plurality of said filter elements, each said filter element having a said shaft driven by said extending means.

11. The improvement of claim 10 wherein said driven member comprises a common member connecting said plurality of shafts to uniformly extend the springs in said plurality of filter elements.

12. The improvement of claim 9 wherein said housing has a filtrate chamber and a sludge chamber separated by a dividing panel, said filter element is disposed in said housing with said spring in said sludge chamber and said shaft extending from said movable end of said spring through a sealed orifice in said dividing panel into said filtrate chamber, said shaft is a tube having a first opening communicating the interior of said tube with the interior of said coil spring, and said shaft has a second opening communicating said first opening with said filtrate chamber when said spring is in said compact filtering position.

13. The improvement of claim 6 wherein said extending means comprises a vibration spring exerting a force against the force of said coil spring.

14. The improvement of claim 13 wherein said vibration spring exerts a force against the pressure of a reverse liquid flow in said filter.

15. The improvement of claim 14 further including a vibrating member connecting said coil spring and said vibrating spring, said vibrating member having a flow surface facing said reverse liquid flow and transmitting said reverse liquid flow pressure to said springs.

16. The improvement of claim 15 wherein said vibrating spring is a second coil spring, said vibrating member comprises a rod extending within said springs between the ends thereof, and said flow surface is conical.

17. The improvement of claim 6 further including means for vibrating said spring.

18. The improvement of claim 17 wherein said vibrating means vibrates said spring at a resonating frequency.

19. The improvement of claim 17 wherein said vibrating means is a compressed air piston motor.

20. The improvement of claim 17 wherein said vibrating means is a linear vibration motor.

21. The improvement of claim 6 wherein said housing comprises a filtrate chamber and a sludge chamber separated by a dividing panel, said spring extends away from said panel in said sludge chamber, and said sludge chamber has a sludge collection portion spaced from said panel a distance greater than the extending reach of said spring.

22. The improvement of claim 6 wherein said extending means comprises a compressed air piston motor.

23. A liquid filter for producing a dry filter cake comprising a housing having a vertically upper filtrate chamber and a vertically lower sludge chamber separated by a dividing panel, said filtrate chamber having a liquid outlet, said sludge chamber having a liquid inlet, a compressed gas inlet, and a filter cake outlet, at least one filter element extending through said panel, said filter element comprising a coil spring extending vertically downward from said panel in said sludge chamber, a liquid conveying tube connected to the lower end of said spring and extending upwardly therefrom through a sealed orifice in said panel into said filtrate chamber, a first opening in said tube communicating the interior thereof with said sludge chamber, a second opening in said tube communicating the interior thereof with said filtrate chamber, and, said tube being shiftable vertically downward through said orifice to move said second opening out of communication with said filtrate chamber and to extend said spring.

24. In a liquid filter comprising a housing, at least one gap type filter element in said housing, said filter element comprising a profile wire wound into a helical spring with spaced apart projections extending axially between the coils of said spring and defining filter gaps therebetween, the improvement comprising; means for extending said spring to move said coils apart axially, said spring having a fixed end and an axially movable end, said extending means being connected to said movable end and comprising a drive means and a driven member, said driven member connecting said drive means to said movable end of said spring.

25. The improvement of claim 24 wherein said extending means comprises a vibration spring exerting a force against the force of said helical spring.

26. The improvement of claim 25 wherein said vibration spring exerts a force against the pressure of a reverse liquid flow in said filter.

27. The improvement of claim 26 further including a vibrating member connecting said coil spring and said vibrating spring, said vibrating member having a flow surface facing said reverse liquid flow and transmitting said reverse liquid flow pressure to said springs.

28. The improvement of claim 27 wherein said vibrating spring is a second coil spring, said vibrating member comprises a rod extending within said springs between the ends thereof, and said flow surface is conical.

29. The improvement of claim 24 wherein said driven member comprises a shaft extending through the interior of said spring.

30. The improvement of claim 29 wherein said housing includes a plurality of said filter elements, each said filter element having a said shaft driven by said extending means.

31. The improvement of claim 30 wherein said driven member comprises a common member connecting said plurality of shafts to uniformly extend the springs in said plurality of filter elements.

32. The improvement of claim 29 wherein said housing has a filtrate chamber and a sludge chamber separated by a dividing panel, said filter element is disposed in said housing with said spring in said sludge chamber and said shaft extending from said movable end of said spring through a sealed orifice in said dividing panel into said filtrate chamber, said shaft is a tube having a first opening communicating the interior of said tube with the interior of said helical spring, and said shaft has a second opening communicating said first opening with said filtrate chamber when said spring is not extended.

* * * * *